July 14, 1953 — T. P. CHASE — 2,645,312
HYDRAULIC BRAKE ADJUSTER
Filed June 2, 1949

Inventor
Theron P. Chase

Attorneys

Patented July 14, 1953

2,645,312

UNITED STATES PATENT OFFICE 2,645,312

HYDRAULIC BRAKE ADJUSTER

Theron P. Chase, Huntington Woods, Mich.

Application June 2, 1949, Serial No. 96,799

12 Claims. (Cl. 188—79.5)

This invention relates to hydraulic brakes and more particularly to an improved wheel cylinder dirt seal.

In wheel cylinders where the adjustment is made by varying the length of the strut screw which bears against the outer end of the wheel cylinder piston, or a stop element on the piston, it has been found difficult to provide a satisfactory dirt seal. The general practice of employing a sheet metal cup closing and engaging the end and adjacent outer cylindrical surface of the wheel cylinder does not produce a dirt-tight seal under severe conditions. When rubber seals are used with normal construction, the rubber seal generally sticks to the strut screw and is broken when the first brake adjustment is made.

In accordance with this invention the stop element, which is the equivalent of the cap element in the present construction, is inwardly depressed to bear against a recessed portion of the piston. The inner portion of this stop element has a spherical seat to receive an internally threaded strut sleeve. The adjusting strut screw is threaded into this sleeve and the adjusting star wheel is secured to the outside surface of the sleeve. An oil retainer cup is tightly fitted into the recess in the stop element and has a packing closely surrounding the sleeve. The boot type rubber seal then grips the outside surface of the cylinder and the oil retainer cup to prevent the entrance of dirt and dust between the cylinder and piston.

The object of this invention is to provide an improved seal between the wheel cylinder and adjusting screw and piston assembly.

Another object of the invention is to provide in a wheel cylinder assembly an adjusting sleeve and strut having an oil retainer cup surrounding the sleeve in order to lubricate the screw and to provide anchorage for a boot type seal which will not rotate with respect to the wheel cylinder when the brakes are adjusted.

These and other objects and the invention will be more apparent from the specific embodiment of the invention shown in the following drawing and specification.

Figure 1:
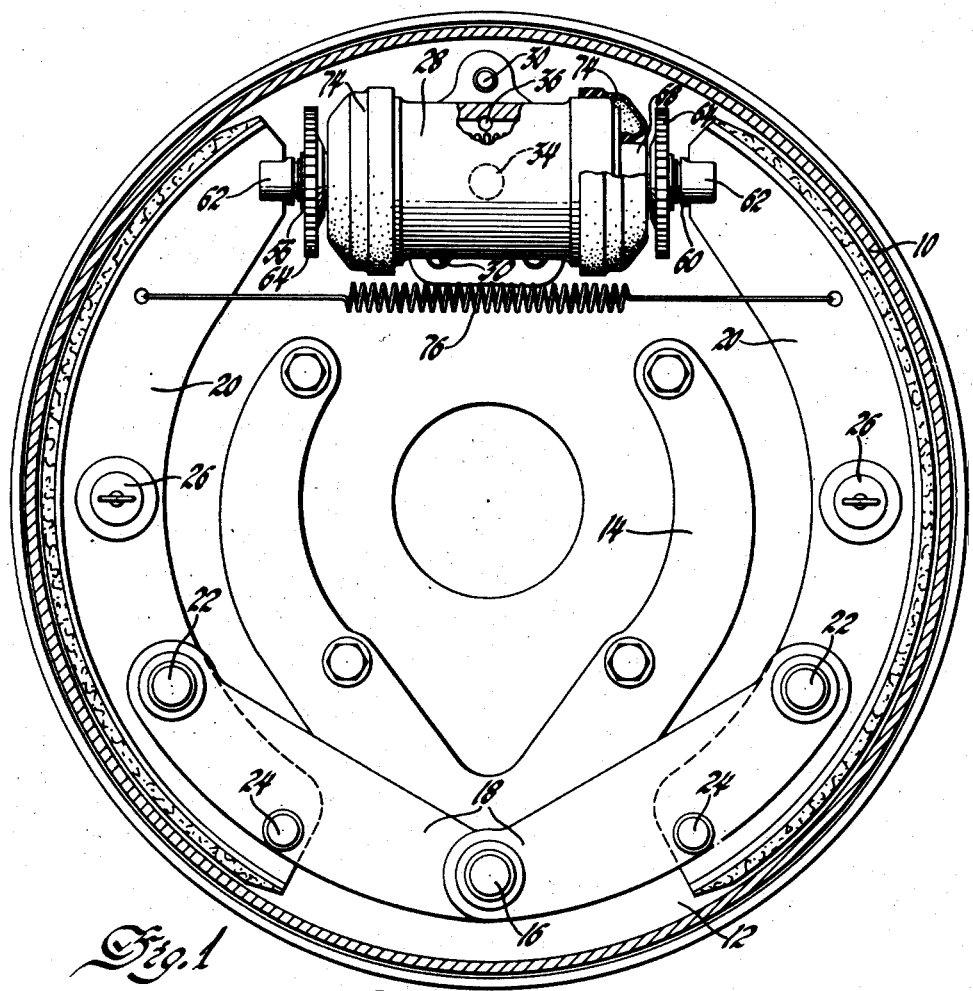
Figure 1 is an elevation with parts in section of the brake employing the invention.
Figure 2:
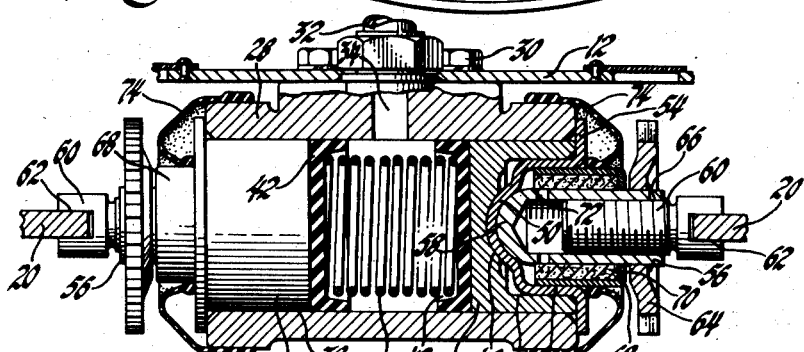
Figure 2 is an enlarged partial view of the brake showing the wheel cylinder and seal with parts in section.

The invention is illustrated on a Huck type brake having a drum 10 mounted on the vehicle wheel in the conventional manner and a backing plate 12 supported by the axle in a suitable manner. A support 14 is suitably secured to the backing plate and has a pin 16 positioned at the lower center of the backing plate to pivotally support and anchor the Huck links 18. The Huck links are pivotally connected to the brake shoes 20 by the pivot pin 22 and the sliding pin 24. Suitable means 26, such as springs, may be employed to hold the brake shoes in contact with the backing plate.

A wheel cylinder 28 is secured to the backing plate 12 by the screws 30. A hydraulic fluid line 32 passes through the backing plate and is connected to the port 34 in the side wall of the wheel cylinder 28. A bleed port 36 is located at the top of the cylinder.

The wheel cylinder 28 has a smooth center bore 39 in which are mounted two hollow pistons 40. Each piston has a packing cup 42 set on the inside face of the piston and having a lip engaging the internal piston walls. A spring 44 located between the pistons engages the sealing cups 42 and holds them in contact with the face of the pistons 40. The pistons 40 have a flat front face and a recess 46 in the rear face. The base of the recess 46 has a central spherical seat 48, which receives a complementary spherical portion 50 of a stamped sheet metal stop element 52. The stop element has a radial flange 54, which extends outward beyond the piston and over the annular end wall of the cylinder 28 in order to limit the inward movement of the stop and piston under the influence of the retraction spring 76. An internally threaded strut sleeve 56 having a spherical seat 58 at its inner and closed end is positioned in the seat 50 in the stop. A strut screw 60 having a slotted end 62 to engage the end of the brake shoe 20 is threaded into the sleeve 56. Adjacent the outer end of the sleeve 56 a star wheel 64 is secured by welding. The star wheel has a serrated or toothed periphery so that it may be rotated with a screw driver to rotate the adjusting strut sleeve. A friction lock is provided between the strut screw and the sleeve by an elongated circumferential slot 66 adjacent the outer end of the sleeve. The slot such as a saw cut extends 90° to 180° about the circumference of the tube and is perpendicular to the axis of the tube. After the sleeve is threaded and the slot cut, the end portion weakened by the slot is displaced slightly inwardly but without movement out of the cylindrical form of the tube to misalign the threads or to move certain threads closer together and thus provide a friction lock. The friction lock between the strut screw and the sleeve prevents relative rotation between these parts due to vibration and the brake actuation forces but permits manual movement of the star wheel 64 and sleeve 56 relative to the strut screw 60 to adjust the brakes.

A light sheet metal retainer cup 68 is secured by a press fit within the recessed portion of the stop 52 to both secure and seal the cup to the stop. A felt packing 70 soaked in a lubricant such as oil or grease is positioned within the cup 68 and lubricates and seals the space between the stop 52 and the sleeve 56. A hole 72 is provided in the sleeve 56 so that oil may enter the sleeve to lubricate the threads on the strut sleeve and screw. A flexible rubber boot type seal 74 having a rib at each end is resiliently snapped over the end of the cylinder 28 and engages the outer surface of oil retaining cup 68.

The seal accomplishes a dual function of both lubricating and excluding the dirt from the adjusting screw and the wheel cylinder. The oil retainer cup provides a source of lubricant over an extended period of time for the pivoted joint between the sleeve 56 and the stop 54, and excludes dirt from the bearing surfaces between these parts. In addition, the lubricant is able to flow through the holes 72 in the sleeve to lubricate the adjusting screw so that the screw will not become jammed to prevent adjustment of the brakes. The rubber boot type seal 74 which clamps about or grips the cylinder 28 and the oil retainer cup 68 will exclude dirt and dust from the end of the piston and cylinder. Since the oil retainer cup and the cylinder are not rotated relative to each other during brake adjustment, there will be no tendency to tear the boot seal 74 when a brake adjustment is made. The boot seal will easily flex without rupture to accommodate for the inward and outward movement of the piston over an extended period.

The above described specific embodiment of the invention is capable of various modifications within the scope of the invention as defined in the appended claims.

I claim:

1. In a brake, a cylinder, a piston means within said cylinder, a strut connected to said piston means, a retainer operatively secured to said piston means, sealing means between said retainer and said strut, and a boot seal engaging said cylinder and said retainer.

2. In a brake, a cylinder, piston means within said cylinder, an adjusting strut rotatably abutting said piston means, a retainer operatively secured to said piston means and having a central aperture, said strut extending through said aperture, sealing means between said retainer and said strut, and a boot seal clamping said cylinder and said retainer.

3. In a brake, a cylinder, piston means having a recess positioned within said cylinder, a strut rotatably engaging said piston means, a retainer sleeve operatively secured to said piston means within said recess, sealing means between said retainer sleeve and said strut, and a boot seal clamping the outside of said cylinder and said retainer sleeve.

4. In a brake assembly, a wheel cylinder, piston means in said cylinder including stop means limiting the inward movement of said piston means, a strut member having two parts threaded together, one part engaging said piston means and the other part engaging said brake shoe, a retainer cup surrounding said strut with sealing means therebetween and in fixed and sealing engagement with said piston means, and a seal between said cylinder and said cup.

5. In a brake assembly, a brake shoe, a wheel cylinder, a recessed piston in said cylinder, stop means having a recess fitting said recessed piston limiting the inward movement of said piston, a strut member having two parts threaded together, one part engaging said recessed stop member and the other part engaging said brake shoe, a retainer cup surrounding said strut and having sealing means engaging said strut and in fixed and sealing engagement with said stop means, and a seal between said cylinder and said stop means.

6. In a brake assembly, a brake shoe, a wheel cylinder, a piston in said cylinder, stop means on said piston limiting the inward movement of said piston, an adjustable strut member having two parts, one part engaging said stop means and the other part engaging said brake shoe, a retainer cup and seal surrounding and sealed to said strut and in fixed and sealing arrangement with said stop means, and a seal between said cylinder and said cup.

7. A cylinder, a piston within said cylinder, a strut mounted to rotate with respect to said piston and move axially with said piston, a retainer means to secure said retainer with respect to said piston, sealing means between said retainer and said strut, and a boot seal sealed to said cylinder and to said piston.

8. In a brake, a cylinder, a piston within said cylinder, said piston having a recessed back, a dished stop element fitting in said recess and having a spherical seat at the base of said dished portion and stop means engaging said cylinder to stop the inward movement of said piston, a strut sleeve having a spherical end engaging said spherical seat, a strut positioned in said strut sleeve, means to adjustably connect said strut to said sleeve, means to adjust said strut, a retainer having a portion secured and sealed to said stop means and having an aperture for said strut sleeve, an oil-soaked packing in said retainer surrounding said sleeve, an aperture in the inner end of said sleeve to provide a passage for the oil to reach the strut, and a boot seal having a ridge sealingly engaging said cylinder and a second ridge sealingly engaging said retainer.

9. In a brake, a cylinder, a piston within said cylinder, said piston having a recessed back, a dished stop element fitting in said recess and having a spherical seat at the base of said dished portion and a stop means engaging said cylinder to stop the inward movement of said piston, a strut sleeve having a spherical end engaging in said spherical seat and an internal thread, a threaded strut screw screwed into said internal thread, a star wheel secured to said strut sleeve, a retainer having a portion secured and sealed to said stop means and having an aperture for said strut sleeve, an oil-soaked packing in said retainer surrounding said sleeve, an aperture in the inner end of said sleeve to provide a passage for the oil to reach the strut thread, and a boot seal having a ridge sealingly engaging said cylinder and a second ridge sealingly engaging said retainer.

10. In a brake, a cylinder, a piston within said cylinder, said piston having a recessed back, a dished stop element fitting in said recess and having a spherical seat at the base of said dished portion and a radial flange extending over the edge of said piston and cylinder to stop the inward movement of said piston, a strut sleeve having a spherical end engaging in said spherical seat and an internal thread, a threaded strut screw screwed into said internal thread, a star wheel secured to said strut sleeve, a retainer having a portion secured and sealed to said stop and having an aperture for said strut sleeve, an oil-soaked packing in said retainer surrounding said sleeve, an aperture in the inner end of said sleeve to provide a passage for the oil to reach the strut thread, and a boot seal having a rib sealingly engaging said cylinder and a second rib sealingly engaging said retainer.

11. In a brake assembly having a wheel cylinder dirt seal, a wheel cylinder, piston means in said wheel cylinder, a strut member engaging said piston means, a seal retainer surrounding said strut, sealing means between said strut and said retainer allowing relative rotation between the strut and retainer, and a seal between said seal retainer and said wheel cylinder.

12. A wheel cylinder and dirt seal construction for use in a brake assembly comprising a wheel cylinder, a piston in said wheel cylinder, said piston having a strut abutment, a seal engaging said cylinder in sealing engagement, a portion of said seal covering the end of said cylinder having an aperture therein, a seal retainer having a central bore with seal packing therein positioned and sealed in said aperture in said seal, and a strut engaging seal packing positioned in said seal retainer.

THERON P. CHASE.

References Cited in the file of this patent

UNITED STATES PATENTS

| Number | Name | Date |
|---|---|---|
| 1,943,886 | Carroll | Jan. 16, 1934 |
| 1,961,919 | Anderson | June 5, 1934 |
| 2,074,362 | Bowen | Mar. 23, 1937 |
| 2,212,934 | Gates | Aug. 27, 1940 |
| 2,398,910 | Pontius | Apr. 23, 1946 |